J. W. BARNES.
LOCK FOR LEVERS.
APPLICATION FILED JULY 3, 1911.

1,100,646.

Patented June 16, 1914.

Witnesses
W. S. Bock
A. L. Phelps

Inventor
John W. Barnes

By C. C. Shepherd
Attorney

UNITED STATES PATENT OFFICE.

JOHN W. BARNES, OF COLUMBUS, OHIO.

LOCK FOR LEVERS.

1,100,646.  Specification of Letters Patent.  Patented June 16, 1914.

Application filed July 3, 1911. Serial No. 636,750.

*To all whom it may concern:*

Be it known that I, JOHN W. BARNES, a citizen of the United States, residing at Columbus, in the county of Franklin and State of Ohio, have invented certain new and useful Improvements in Locks for Levers, of which the following is a specification.

My invention pertains to an improved lock for levers and is particularly designed for application to the gear shift lever of an automobile.

It is aimed to provide a lock for this lever particularly applicable when the lever works in an H-segment such as is generally used and to construct a device which is in the nature of a reasonably permanent attachment. While my attachment is permanent, it is nevertheless readily movable into inoperative position and in such inoperative position, it will be entirely out of the path of any of the operating parts connected to the H-segment.

Figure 1:
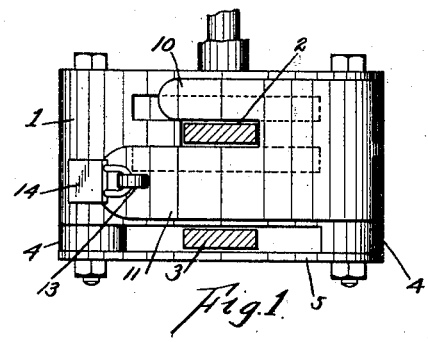
Figure 2:
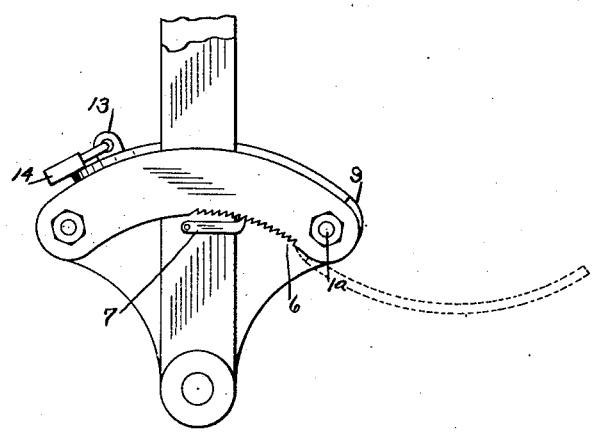
Figure 3:
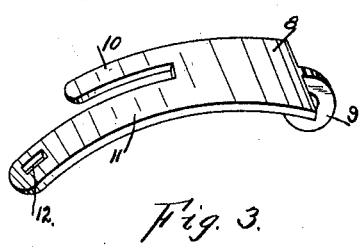

The preferred form of my invention is shown in the accompanying drawings, in which similar characters of reference designate corresponding parts, and in which:

Figure 1 is a top plan view of the H-segment showing both the gear shift lever and the brake lever normally in operative position and showing the lock in operative position. Fig. 2 is a side elevation of the H-segment with the lock in operative position and showing, in dotted lines, the position of the lock when inoperative, and, Fig. 3 is a perspective of a lock removed.

In the drawings, the normal H-segment is shown and designated 1. Operating in this segment is the gear shift lever 2 shown in neutral position and the brake lever 3 mounted in a supplemental groove formed by the lugs 4 and arch 5, said arch having its lower edge provided with ratchet teeth as at 6 for coöperation with a pawl 7 carried by the brake lever 3.

The locking element 8 is preferably of an arcuate contour to conform to the upper surface of the segment 1 and is provided at its rear edge with a pierced lug 9 for a pivotal mounting upon the bolt 1ª, extending through one end of the segment. The body proper of the lock is provided with fingers 10 and 11 sufficiently spaced for the reception therebetween of the lever 2 and having the end of the slot or space mentioned so located as to about aline with the near wall of the transverse slot in the H-groove, when the lock is in upright position. One of the fingers is formed so that it will extend considerably past the gear shift lever when in neutral position and is provided near its extremity with a slot 12 for the reception of a staple 13 carried by the segment 1.

In operation, it will be apparent that, with the gear shift lever in neutral position, the lock may be swung on its pivot from an inoperative position such as that shown in dotted lines in Fig. 2, until it is in superimposed relation with the segment top in this position, the opposing sides of the fingers 10 and 11 are closing the wall of the longitudinal slot in the H, and consequently maintaining the lever 2 within the transverse slot and preventing lateral movement thereof. As it is well understood that the lever must be shifted laterally before an effective operation can take place, it will be seen that it is locked in inoperative position. To insure against accidental release of the pivoted member, I customarily provide a pad-lock shown at 14 which passes through the staple 13 and positively maintains the lock 8 in operative position.

What I claim, is—

A lock for a lever operating in an H-segment comprising a member pivotally attached at one of its ends to said segment, forwardly extending fingers slightly spaced from each other, integrally formed on said member, said fingers embracing the lever to hold it in neutral position, one of said fingers being longer than the other and having a slot formed therein, a staple on said segment in a position to register with said slot in said longer finger when said member is in locked position, and a padlock for said staple.

In testimony whereof I affix my signature in presence of two witnesses.

JOHN W. BARNES.

Witnesses:
A. L. PHELPS,
INGLE A. MORRIS.

Copies of this patent may be obtained for five cents each, by addressing the "Commissioner of Patents, Washington, D. C."